Figure 1:
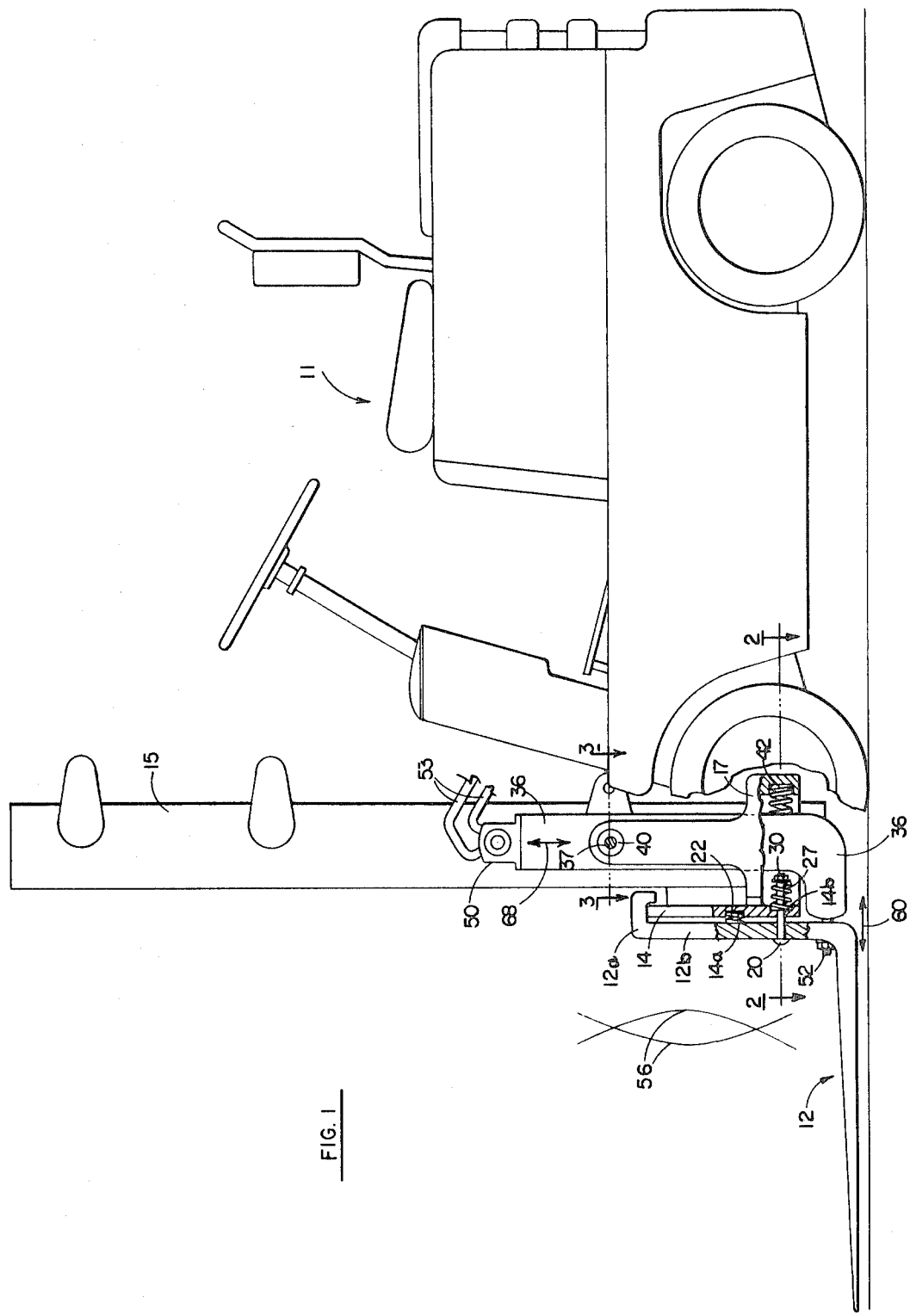

United States Patent

[11] 3,612,319

| [72] | Inventor | Albert G. Bodine<br>7877 Woodley Ave., Van Nuys, Calif.<br>91406 |
|---|---|---|
| [21] | Appl. No. | 874,245 |
| [22] | Filed | Nov. 5, 1969 |
| [45] | Patented | Oct. 12, 1971 |

[54] SONIC APPARATUS FOR MATERIAL HANDLING EQUIPMENT
11 Claims, 8 Drawing Figs.

[52] U.S. Cl. .................................................... 214/750,
180/7 R, 214/83.3, 198/DA, 198/DB
[51] Int. Cl. .................................................... B60p 1/58,
B65g 27/20
[50] Field of Search............................................ 214/83.3,
64.2, 750; 198/220 DA, 220 DB; 209/332, 330,
366, 326, 328, 367; 180/1 AV, 7 R

[56] References Cited
UNITED STATES PATENTS

| 2,628,734 | 2/1953 | Jannsen........................ | 214/750 |
| 2,877,916 | 3/1959 | Repke et al................... | 214/750 |

Primary Examiner—Albert J. Makay
Attorney—Sokolski & Wohlgemuth

ABSTRACT: Means are provided to apply sonic energy to selected portions of material handling equipment to reduce the friction at the interfaces between either this portion of the equipment and material to be handled thereby, or in certain instances at the interfaces between equipment portions and the surface over which the equipment is to be moved. Sonic rectifier means are provided for providing a rectified or non-linear acoustical wave action at the interface at which relative motion is desired, this sonic action providing a propulsive force for either loading material onto the equipment or aiding in the propulsion of such equipment from one position to another.

INVENTOR
ALBERT G. BODINE
BY
SOKOLSKI & WOHLGEMUTH
ATTORNEYS

INVENTOR
ALBERT G. BODINE
BY
SOKOLSKI & WOHLGEMUTH
ATTORNEYS

SONIC APPARATUS FOR MATERIAL HANDLING EQUIPMENT

This invention relates to material-handling equipment, and more particularly to such equipment in which sonic energy is utilized to facilitate the loading and movement of such equipment.

In the handling of crates, packages and the like in warehousing, storage and transportation operations, forklift trucks are generally used for the lifting and moving operations. It is often quite difficult, especially when handling very heavy equipment, to get the forks of the forklift underneath the packages. Sometimes in trying to get the forks underneath a heavy crate or package, damage to the package will result due to the high friction between the tool and the package. Also in loading material tightly in a confined space such as a hold, it is difficult sometimes to utilize a forklift effectively due to its maneuvering limitations. When dealing with heavy pallets, the close positioning of such pallets is difficult or impossible to achieve.

The apparatus of this invention overcomes these various shortcomings of prior art material-handling equipment by providing means for sonically activating the interface between the handling tool of the equipment and the material being handled, and in the case of pallets, at the interface between the pallet and a floor surface on which it is to be positioned. The sonic energy is utilized both to reduce the static friction at such interfaces and, by a unique sonic rectification of the energy, in combination with coulomb friction effects, for providing a propulsive force for either moving material onto the handling equipment or propelling a handling unit, such as a pallet or the like, over a floor surface.

It is therefore the principal object of this invention to provide means for utilizing sonic energy to reduce friction at significant interfaces of material-handling equipment and to provide a propulsive force at such interfaces.

Figure 2:
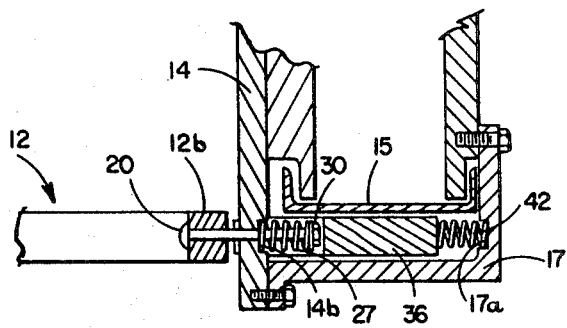
Figure 4:
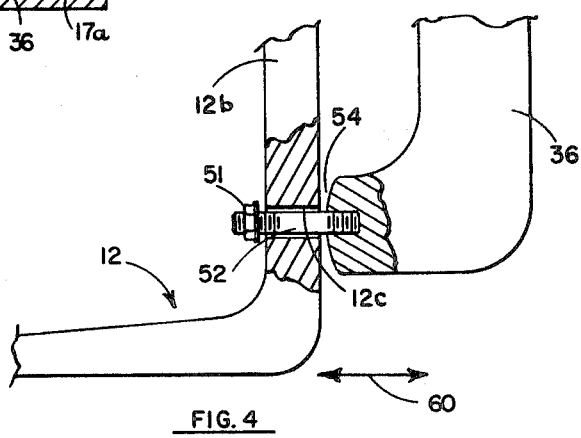
Figure 3:
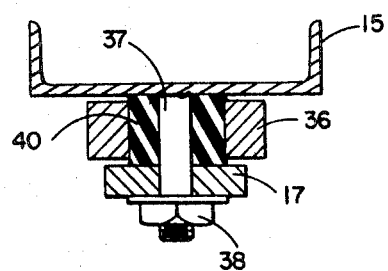
Figure 5:
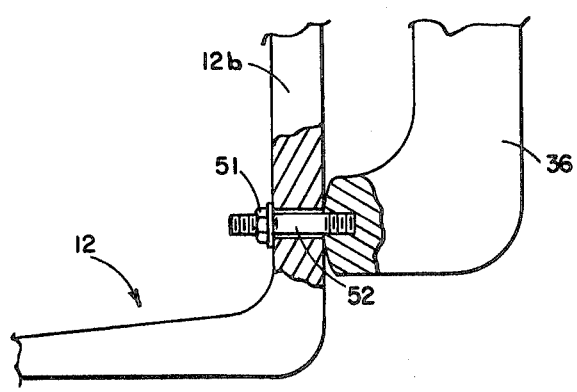
Figure 6:
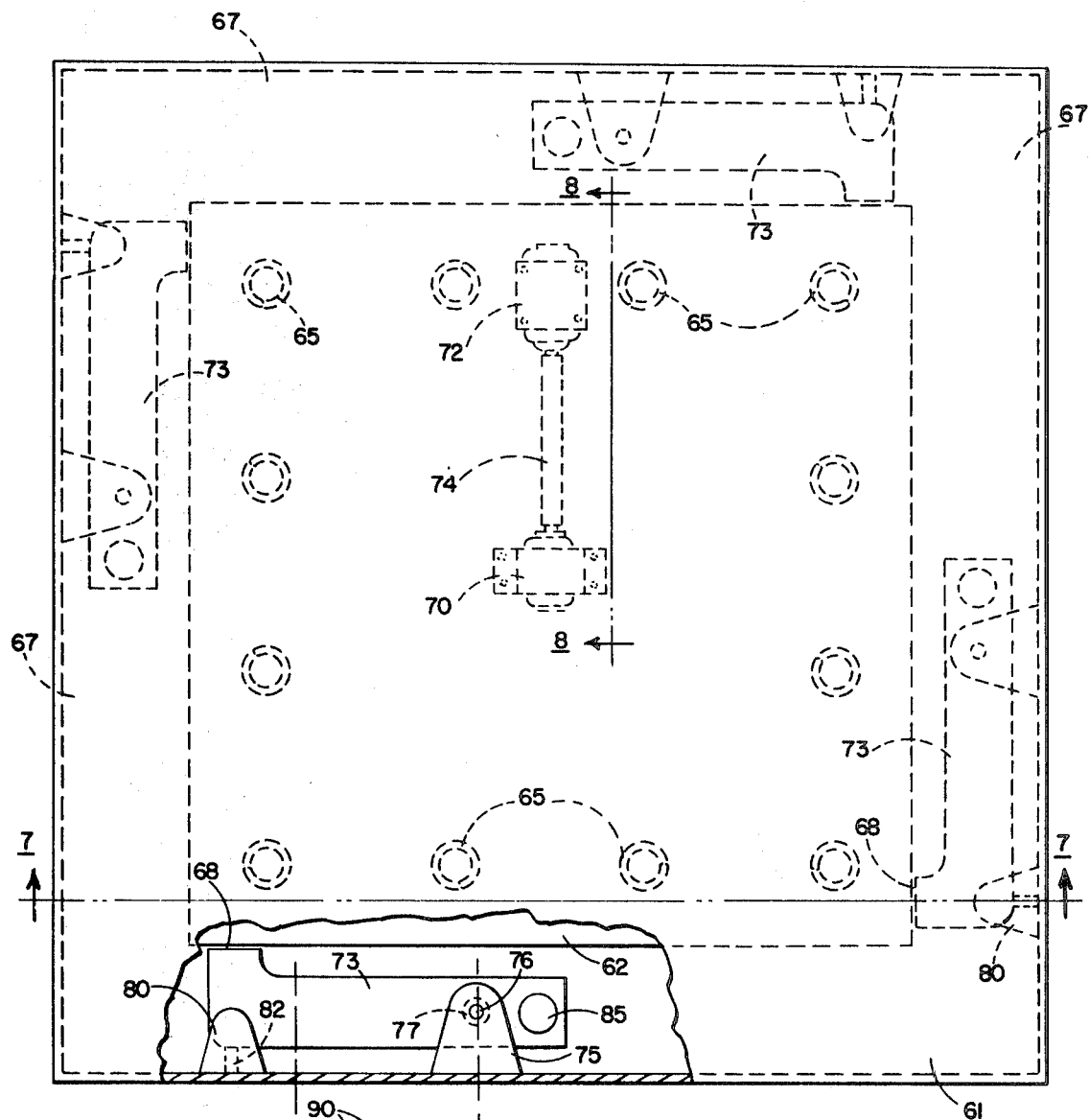
Figure 7:
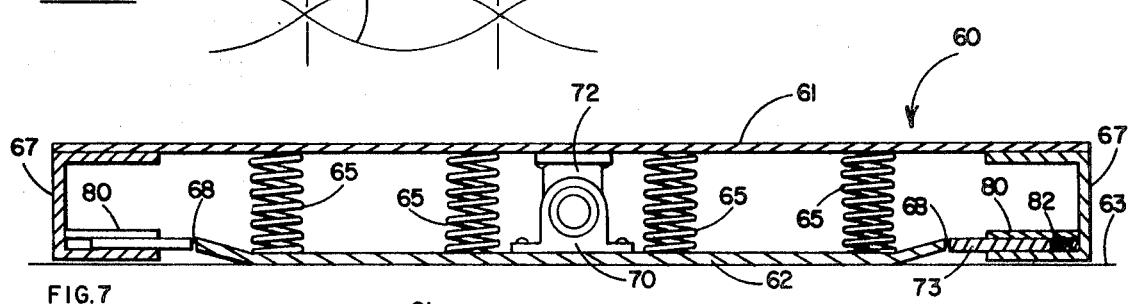
Figure 8:
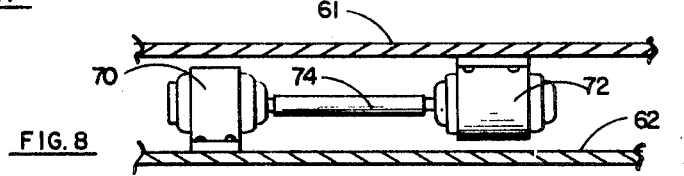

Other objects of this invention will become apparent as the description proceeds in connection with the accompanying drawings of which:

FIG. 1 is an elevational view of the first embodiment of the device of the invention as incorporated into a forklift truck, FIG. 2 is a cross-sectional view taken along the plane indicated by 2—2 in FIG. 1, FIG. 3 is a cross-sectional view taken along the plane indicated by 3—3 in FIG. 1, FIG. 4 is an elevational view partially in cross section illustrating the resonant bar of the first embodiment adjusted in position for nonlinear operation, FIG. 5 illustrates the resonant bar of the first embodiment adjusted in position for linear nonrectified operation, FIG. 6 is a plan view of a second embodiment of the device of the invention as incorporated into a pallet, FIG. 7 is a cross section taken along the plane indicated by 7—7 in FIG. 2, and FIG. 8 is a view taken along the plane indicated by 8—8 in FIG. 6.

It has been found most helpful in analyzing the device of this invention to analogize the acoustically vibrating circuit utilized to an equivalent electrical circuit. This sort of approach to analysis is well known to those skilled in the art and is described, for example, in chapter 2 of "sonics" by Hueter and Bolt, published in 1955 by John Wiley and Sons. In making such an analogy, force F is equated with electrical voltage E, velocity of vibration $u$ is equated with electrical current $i$, mechanical compliance $C_m$ is equated with electrical compliance $C_e$, mass M is equated with electrical inductance L, mechanical resistance (friction) $R_m$ is equated with electrical resistance R and mechanical impedance $Z_m$ is equated with electrical impedance $Z_e$.

Thus, it can be shown that if a member is elastically vibrated by means of an acoustical sinusoidal force $F_0\sin\omega t$ ($\omega$ being equal to $2\pi$ times the frequency of vibration), that $$Z_m = R_m + j\left(\omega M - \frac{1}{\omega C_m}\right) = \frac{F_0 \sin \omega t}{u} \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration $u$ is at a maximum, power factor is unity, and energy is more efficiently delivered to a load to which the resonant system may be coupled.

It is important to note the significance of the attainment of high acoustical Q in the resonant system being driven, to increase the efficiency of the vibration thereof and to provide a maximum amount of power. As for an equivalent electrical circuit, the Q of an acoustically vibrating circuit is defined as the sharpness of resonance thereof and is indicative of the ratio of the energy stored in each vibration cycle to the energy used in each such cycle. Q is mathematically equated to the ratio between $\omega M$ and $R_m$. Thus, the effective Q of the vibrating circuit can be maximized to make for highly efficient, high-amplitude vibration by minimizing the effect of friction in the circuit and/or maximizing the effect of mass in such circuit.

In considering the significance of the parameters described in connection with equation (1), it should be kept in mind that the total effective resistance, mass, and compliance in the acoustically vibrating circuit are represented in the equation and that these parameters may be distributed throughout the system rather than being lumped in any one component or portion thereof.

It is also to be noted that orbiting mass oscillators are utilized in the implementation of the invention that automatically adjust their output frequency and phase to maintain resonance with changes in the characteristics of the load. Thus, in the face of changes in the effective mass and compliance presented by the load with changes in the conditions of the work material as it is sonically excited, the system automatically is maintained in optimum resonant operation by virtue of the "lock-in" characteristic of applicant's unique orbiting-mass oscillators. Furthermore, in this connection the orbiting-mass oscillator automatically changes not only its frequency but its phase angle and therefore its power factor with changes in the resistive impedance load, to assure optimum efficiency of operation at all times. The vibrational output from such orbiting-mass oscillators also tends to be constrained by the resonator to be generated along a controlled predetermined coherent path to provide maximum output along a desired axis.

Briefly described, the device of the invention comprises a resonator member which is supported on the material-handling equipment and which has an orbiting-mass oscillator coupled thereto for providing sonic energy to cause resonant vibration thereof. In one embodiment of the invention which is incorporated into a forklift truck, the sonic energy is coupled from the resonator member to the forks of the lift to cause vibration thereof. The sonic energy reduces the friction between the opposing surfaces of these forks and the material being handled thereby. Means are provided at the coupling between the resonator and the fork to rectify the sonic energy such as to provide a nonlinear sonic action at the material-handling interface. This nonlinear sonic action operates to effectively "pump" the material onto the fork.

In another embodiment of the invention involving a pallet, sonic energy is applied to the base portion of the pallet to reduce the friction at its interface with the floor on which the pallet is resting, and additionally nonlinear rectified sonic energy is applied at this same interface to propel the pallet over the floor in a desired manner.

Referring now to FIGS. 1—5, a first embodiment of the device of the invention as incorporated into a forklift truck is illustrated. Forklift truck 11 has a guide bar 15 along which the guide and support frame 17 for the fork 12 can be slidably positioned in response to a drive mechanism (not shown). An apron plate 14 is fixedly attached to support frame 17. The parts thus far described are components of a conventional forklift and therefore need not here be described in detail.

Fork structure 12 is supported on apron 14 by means of an angled end portion 12a which brackets the end of the apron, and by bolt 20 which fits through apertures formed in the fork and the apron. A separation spring 22 is retained in recess 14a and abuts against the back of the upright portion 12b of the fork. Spring 22 thus resiliently separates the apron front surface from the fork and acts as a vibration isolator member. Spring 27 is retained between recess 14b of the apron and nut member 30 attached to the end of bolt 20. Spring 27 thus acts to resiliently urge the fork 12 toward the apron 14 and, as to be explained further on in the specification, acts as a return spring to aid the vibrational "pumping" action.

Elastic resonator bar member 36, which should be fabricated of a highly elastic material such as steel, is pivotally supported on pin member 37 which is fixedly attached to frame 17 on apron 14. Vibrational isolation is provided between pin member 37 and resonator bar 36 by means of rubber bushing 40, the various members being retained on the pin member by means of nut 38. Spring 42 is retained in recess 17a formed in frame 17 and abuts against the back of resonator bar 36 to resiliently urge the bar member towards fork 12.

An orbiting-mass oscillator 50 has its casing fixedly attached to the top of resonator bar 36 and is rotatably driven by a hydraulic motor (not shown) which receives its drive through hydraulic lines 53. Oscillator 50 may be one of the types described in my U.S. Pat. Nos. 2,960,314 or 3,217,551. Stud member 52 has one end thereof threadably attached to resonant bar 36 and fits through aperture 12c in the fork structure, as shown in FIGS. 4 and 5. An adjustment nut 51 is threadably attached to the end of stud 52 to permit the adjustment of the maximum rectifier gap spacing between upright portion 12b of fork 12 and resonator bar 36. Springs 22, 27 and 42 are chosen and the tensioning of spring 27 is adjusted by means of nut 30 so that with nut 51 near the end of the stud, as shown in FIG. 4, there will be a cyclic gap 54 between the vertical portion 12b of the fork and resonator bar 36 during back cycles of bar 36. This provides for a sonic rectification of the vibratory energy with nonlinear vibratory energy being transferred to the fork as hereinafter to be described. As an option, with nut 51 tightened down to bring resonator bar 36 into close contact with fork 12, as shown in FIG. 5, continuous wave full cycle vibration is transferred to the fork from the resonator bar. In operating the device to facilitate the movement of packages and the like onto fork 12, the eccentric rotor of oscillator 50 is driven at a speed such as to set up resonant elastic vibration of elastic bar 36 so as to set up standing wave vibration therein as indicated by graph lines 56. It is to be noted that the point along resonator bar 36 at which it is supported on pin 37 coincides with a nodal region of standing wave pattern 56, thus assuring minimum transfer of vibrational energy to the support structure.

The sonic energy transferred to resonator bar 36 from oscillator 50 has a component transverse of the bar as indicated in FIG. 4 by arrows 60. With the rectifier gap 54 adjusted as indicated in FIG. 4, this transverse vibratory component will cause bar 36 to move towards and away from vertical portion 12b of the fork at the vibratory frequency. In all or some of its excursions towards fork 12, it will strike the fork giving it a high-velocity, short duration vibratory pulse. Bar 36 will then move in the opposite direction during which time fork 12 will return towards its original position in response to the action of return spring 27 and its own elastic properties. This return will be at a lower velocity and will have a longer duration than the first half-cycle of motion.

As per the laws of coulomb friction, in view of the fact that the sliding friction between surfaces is substantially independent of velocity, the longer duration return cycle will provide a greater net frictional force on objects being moved onto the fork and thus will tend to provide an effective pumping action to induce the movement of such objects onto the fork. The vibratory component of the sonic energy along the longitudinal axis of bar 36 as indicated by arrow 68, is also coupled to the fork and provides an up-and-down motion thereof which tends to reduce the friction between the material being handled and the fork by virtue of the effective vibratory "lifting" action that it provides.

In the event that the pumping action provided with the sonic rectification of the energy input is not desired, nut 51 can be tightened down as indicated in FIG. 5 to eliminate the rectification gap and to provide a continuous coupling of sonic energy between the bar and the fork, such as for friction reduction primarily.

Referring now to FIGS. 6–8, a second embodiment of the device of the invention for handling a device such as a pallet is illustrated. Pallet 60 has an upper plate 61 on which a load to be handled (not shown) is placed and a lower plate 62 which rests on floor 63. Lower plate 62 is separated from upper plate 61 and interconnected therewith by means of isolator springs 65 which are attached at their opposite ends to each of the plates. Side frame portions 67 are fixedly attached to the opposite end portions of upper plate 61 and form a perimeter around the pallet, lower plate 62 being separated from these side frame portions.

Orbiting mass oscillator 70 has its casing fixedly attached to bottom plate 62 and is rotatably driven by means of motor 72 which is mounted on the underside of top plate 61, the motor and oscillator being interconnected by drive shaft 74. Oscillator 70 is of the orbiting mass type as described in my U.S. Pat. Nos. 2,960,314, and 3,217,551. Bias springs 65 are utilized to carry the load and to vibrationally isolate upper pallet plate 61 from the vibrational energy generated in lower plate 62, thus giving lower plate 62 freedom to vibrate sonically relative to the upper plate on which the load is sitting.

Supported in the flanges of frame 67 on ears 75, which are fixedly attached to the frame, are four resonator bars 73. Bars 73 are pivotally supported on pins 76 which are attached to the ears 75, an isolator bushing 77 being provided between each pin and bar to provide vibrational isolation therebetween. The bottom portions of bar members 73 are retained in the bottom of frame 67 by means of ears 80 which also extend from the side of the frame 67. A bias spring 82 is retained between the back of each of bar members 73 and the frame.

Mounted in each of the bar members 73 is an orbiting mass oscillator 85 which may be driven by a pneumatic source (not shown), an oscillator of this type being described in my aforementioned U.S. Pat. No. 2,960,314. Dynamic gaps 68 serve as "rectifier gaps" of the general type described in connection with my first embodiment for implementing the rectification of sonic energy transferred from bar members 73 to lower pallet plate 62. The bar members 73, separately operable, are preferably arranged near the four-corner portions of the pallet to enable selective control of the movement of the pallet in any direction. In propelling the pallet, oscillator 70 is rotatably driven by motor 72 at a rotation speed such as to set up resonant elastic vibration of bottom plate 62. This resonant vibratory energy which appears at the interface between plate 62 and floor 63, particularly the component thereof normal to the interfaced surfaces, effects an acoustic acceleration in this contact area which greatly reduces the friction at this interface. The pallet, with or without operation of oscillator 70, can readily be propelled by selectively resonantly vibrating various of resonant bar members 73, by rotating their associated oscillator 85 at a speed such as to set up a standing wave pattern therein as indicated by graph lines 90. As noted in FIG. 6, the standing wave pattern 90 is preferably such as to produce a nodal region of the standing wave pattern in the vicinity of the attachment points between the bars 73 and frame 67, thus minimizing the transfer of vibrational energy to the frame. With the sonic energization of any one or combination of bars 73, unidirectional pulses of sonic energy are transferred from such bar or bars to plate 62 during the vibratory excursion thereof towards such plate. Reverse direction vibratory excursions against the bias springs 82, of course, will result in no significant energy transfer to plate 62. Thus, it can be seen that propulsive forces can be selectively transferred to plate 62 in any desired direction against its coulomb friction by selectively energizing various ones of bar members 73.

The resonant vibration of plate 62 by means of oscillator 70 also operates to reduce the friction between the pallet and the floor on which it is resting, thereby facilitating the propulsion of the pallet under some conditions by virtue of the selective sonic energization of bar members 73, which by means of sonic rectifier action provide a force for propelling the pallet in any desired direction. In this manner, heavily loaded pallets can readily be positioned in storage areas and the like.

The devices of this invention thus provide highly effective means for facilitating the utilization of material-handling equipment to optimum effect, this end result being achieved by implementing the use of sonic energy both to reduce the friction between load-carrying interfaces of such equipment and further providing propulsive forces for providing relative motion between the members forming such interfaces.

I claim:

1. In material-handling equipment, said equipment including a member having a load-bearing surface; the improvement comprising means for reducing the friction at said load-bearing surface and means for providing a propulsive force at said surface, comprising:
   orbiting mass oscillator means coupled to said member,
   means for driving said orbiting mass oscillator means at a frequency such as to set up resonant elastic vibration of said member, said vibration having a component normal to the surface,
   said means for providing a propulsive force including:
   an elastic resonator,
   means for resiliently urging said resonator towards said member,
   a gap being provided between said resonator and said member,
   orbiting mass oscillator means coupled to said resonator,
   means for driving said oscillator means at a frequency such as to set up resonant vibration of said resonator,
   said resonator being vibrated toward and away from said member whereby unidirectional pulses of energy are transferred from said resonator to said member, and
   return spring means for urging said member toward said resonator,
   whereby the unidirectional energy transferred from said resonator to said member has a short duration as compared to that provided by said return spring, thereby providing a net propulsive force at said surface in the direction of the return spring action.

2. The device of claim 1 wherein said equipment comprises a forklift truck said member comprising a fork of said truck.

3. In a pallet having a lower plate and an upper plate with a load-bearing surface:
   orbiting mass oscillator means coupled to said lower plate,
   means for driving said orbiting mass oscillator means at a frequency such as to set up resonant elastic vibration of said lower plate, said vibration having a component normal at the load bearing surface,
   means for resiliently separating said plates from each other,
   floor means for supporting the lower plate,
   a resonator member,
   means for pivotally supporting said resonator member in proximity to an edge of said lower plate,
   spring means for resiliently urging said resonator member toward said lower plate with a gap therebetween, and
   oscillator means for resonantly vibrating said resonator member, unidirectional pulses of energy being transferred from said resonator member to said lower plate to propel said pallet in the direction of said pulses.

4. The device of claim 3 and additionally including three additional resonator members, means for pivotally supporting each of said resonator members in proximity to a separate edge of said lower plate, means for resiliently urging each of said resonator members towards said plate with a gap therebetween and means for resonantly vibrating each of said resonator members, unidirectional pulses of energy being transferred from said resonator members to said lower plate, said resonator members being respectively positioned opposite each of the four corners of said lower plate.

5. In a forklift truck,
   a frame
   a fork member
   means for supporting said fork member on said frame,
   first spring means for resiliently urging said fork member in a direction away from said frame,
   a resonator bar member pivotally supported on said frame,
   a second spring means for resiliently urging said fork member towards said bar member,
   means for adjusting the separation between said bar member and said fork member to provide a rectifier gap therebetween, and orbiting mass oscillator means for resonantly vibrating said bar member, unidirectional pulses of energy being transferred from said bar member to said fork member to propel said fork member in a first direction during a first period of time, said second spring means operating to return said fork member in a direction opposite said first direction during a second period of time substantially longer than said first period of time.

6. The device of claim 5 and further including means for adjusting said rectifier gap and for eliminating said gap entirely.

7. In a pallet,
   an upper plate,
   a lower plate,
   isolator spring means for interconnecting said plates,
   means for supporting said lower plate,
   first orbiting mass oscillator means attached to said lower plate,
   means for driving said first oscillator means at a frequency such as to set up resonant elastic vibration thereof, thereby reducing the friction at the interface between said lower plate and said supporting means,
   a resonator bar member,
   means connected to said upper plate for pivotally supporting said bar member with a portion thereof in close proximity to an edge of said lower plate,
   means for resiliently urging said portion of said bar member towards said lower plate with a rectifier gap being formed therebetween, and
   second orbiting mass oscillator means supported on said bar member for resonantly vibrating said bar member, unidirectional energy pulses being transferred from said bar member to the edge of said lower plate.

8. The pallet of claim 7 and further including third, fourth and fifth bar members similar to said second bar member and each similarly supported in close proximity to separate edges of said lower plate, orbiting mass oscillator means for resonantly vibrating each of said bar members, said oscillator means being selectively driven to provide unidirectional pulses of energy to said lower plate to propel said pallet in a desired manner.

9. In fork lift or pallet equipment, said equipment including a member having a load-bearing surface, the improvement comprising means for providing a propulsive force at said load-bearing surface including,
   an elastic resonator,
   means for resiliently urging said resonator towards said member, a vibratory gap being provided between said resonator and said member,
   orbiting mass oscillator means coupled to said resonator, and
   means for driving said oscillator means at a frequency such as to set up resonant vibration of said resonator,
   said resonator being vibrated towards and away from said member whereby unidirectional pulses of energy are transferred from said resonator to said member.

10. The device of claim 9 and further including return spring means for urging said member toward said bar whereby the unidirectional energy transferred from said bar to said member has a short duration as compared to that provided by said return spring, thereby providing a net propulsive force at said surface in the direction of the return spring action.

11. The device of claim 9 wherein said equipment is a pallet having a lower plate and an upper plate, means for resiliently separating said plates from each other, floor means for supporting the lower plate, a resonator member, means for pivotally supporting said resonator member in proximity to an edge of said lower plate, spring means for resiliently urging said resonator member towards said lower plate with a vibratory gap therebetween and oscillator means for resonantly vibrating said resonator member, unidirectional pulses of energy being transferred from said resonator member to said lower plate to propel said pallet in the direction of said pulses.